(No Model.)

L. C. PRATT.
TWO WHEELED VEHICLE.

No. 366,344. Patented July 12, 1887.

Witnesses.
John C. Perkins
Phillip P. Schau

Inventor:
Lemuel C. Pratt
By Lucius C. West
Atty.

UNITED STATES PATENT OFFICE.

LEMUEL C. PRATT, OF KALAMAZOO, MICHIGAN.

TWO-WHEELED VEHICLE.

SPECIFICATION forming part of Letters Patent No. 366,344, dated July 12, 1887.

Application filed April 12, 1887. Serial No. 234,500. (No model.)

*To all whom it may concern:*

Be it known that I, LEMUEL C. PRATT, a citizen of the United States, residing at Kalamazoo, county of Kalamazoo, State of Michigan, have invented a new and useful Two-Wheeled Vehicle, of which the following is a specification.

This invention has for its object the below described and claimed construction, whereby the body or seat-bars and the leverage purchase on the springs are sustained entirely by the axle, instead of by the thills, in a vehicle of this class.

Figure 1:
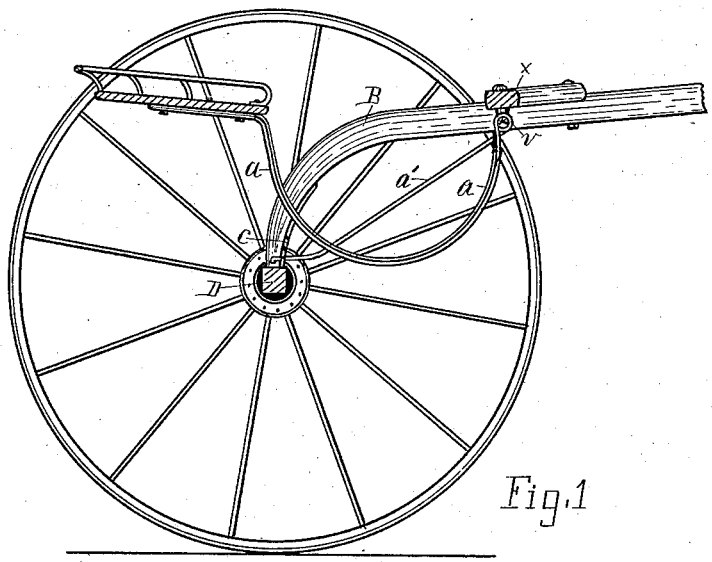
Figure 2:
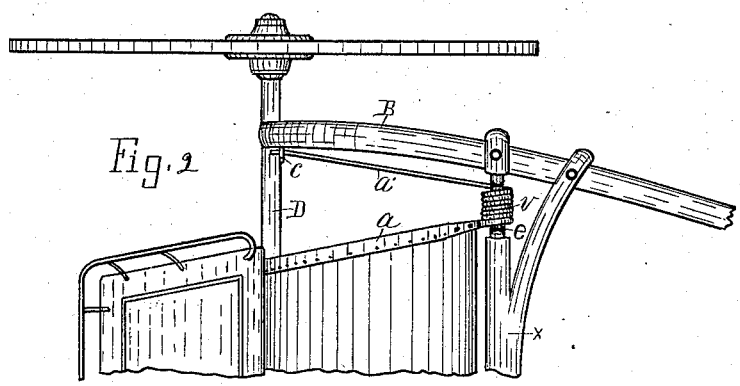
Figure 3:
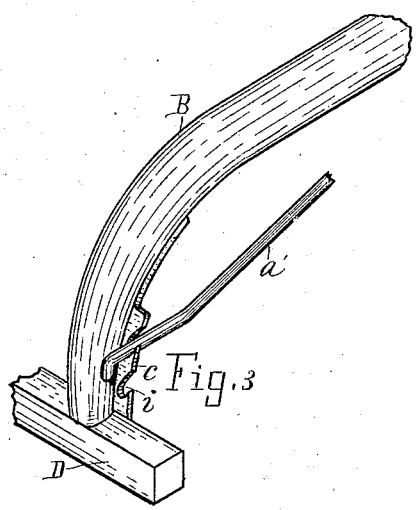

In the drawings forming a part of this specification, Figure 1 is a side elevation, with the seat, axle, and thill cross-bar in section. Fig. 2 is a plan of one side of the vehicle, and Fig. 3 shows broken details in enlarged perspective.

Referring to the lettered parts of the drawings, the seat-bars or body $a$, which may be made in any suitable shape, are attached at their forward end to spiral springs $v$. These springs are located on stirrups pendent from the cross-bar $x$ of the thills B, and the ends of the springs are extended downwardly and rearwardly in bars $a'$, the rear ends of said bars being supported by the axle D. They may rest directly on the axle or be sustained above or below it, or otherwise, so long as they are either directly or indirectly supported by said axle.

The length of the seat-bars in their relation to the length of the bars $a'$ is such that the body of the vehicle really balances on the axle or on the end of the bars $a'$, which are sustained by the axle, and hence the thills are relieved of the great leverage strain which has heretofore caused the thills to break or bend out of shape in vehicles employing terminal springs at the forward end of the seat-bars. By this means the stirrups $e$ merely serve to retain the body in position, and also prevent it from tilting down at the forward end when the occupant enters the vehicle, and before being seated.

The bars $a'$ may be spring metal integral with the spring $v$, as here shown, being a continuation of the same metal, or the said bar may be made from other material and attached at the forward end to the spring, one as an equivalent to the other.

As a means of adjusting the height of the body for heavy and light persons, I have provided the axle with brackets $c$, having a series of notches, $i$, to receive the ends of the bars $a'$. For a heavy person the bars $a'$ are raised to a higher notch. This action does not stiffen the spring, but raises the seat, so that the position of the seat with a heavy person will be on about the same plane as with a light person. The brackets $c$, as here shown, are attached to the axle and thill; but they may be attached directly to the axle D, and project upward or downward from the same.

The action of the body of the vehicle thus elastically supported is very desirable, and secures to the occupant a feeling of greater safety.

Having thus described the invention, what I claim is—

1. The combination of the axle, thills, a body or seat-bars, and spiral springs attached to the forward end of said body or seat-bars at one end of the springs, the other end extending in a bar downward and rearward and supported by the axle, substantially as set forth.

2. The combination of the axle, the notched brackets, the thills, a body or seat-bars, and spiral springs attached to the forward end of the body or seat-bars and extending in bars downward and rearward and resting in notches in said brackets, substantially as set forth.

In testimony of the foregoing I have hereunto subscribed my name in presence of two witnesses.

LEMUEL C. PRATT.

Witnesses:
SAMUEL FOLZ,
EDWARD VROEQIUDENY.